United States Patent Office.

EDWARD POPPOWITSCH, OF BROOKLYN, NEW YORK.

METHOD OF PREPARING BATTERY SOLUTIONS.

SPECIFICATION forming part of Letters Patent No. 480,033, dated August 2, 1892.

Application filed February 6, 1892. Serial No. 420,577. (No specimens.)

*To all whom it may concern:*

Be it known that I, EDWARD POPPOWITSCH, a subject of the King of Hungary, residing at Brooklyn, in the county of Kings and State of New York, have made a new and useful Invention in Galvanic Batteries, of which the following is a specification.

My invention is directed particularly to battery liquids such as are used in connection with two-fluid batteries; and it has for its objects, first, the preparation of a depolarizing liquid for use in primary or voltaic batteries which shall be thoroughly or completely saturated with the depolarizing-salt; second, the preparation of a depolarizing liquid which does not seriously clog or form any obstructing deposit upon the carbon or equivalent inert electrode.

To this end my invention consists in the novel method of preparing a completely-saturated depolarizing solution, as hereinafter described and claimed.

In order that my invention may be fully understood, reference is had to the following specification, which is a full, clear, and exact description of the manner of carrying the same into effect.

I take an ordinary two-fluid-battery cell consisting of a glass retaining-jar including a porous inner cup, with a zinc and exciting liquid in said cup. I then fill the exterior or containing jar about three-fourths full of warm water at about 100° Fahrenheit, the exterior or carbon electrode not being in place. I now fill a wire-gauze basket of ring or annular form, adapted to surround the porous cup, with crystals of bichromate of potash and suspend this annular basket in the warm water at a point near the bottom of the containing-jar with the crystals all immersed. It is allowed to remain thus suspended until the solution becomes saturated up to the base of the ring-basket. I now raise the basket and undissolved crystals an inch or two and permit a second solution like the first to take place. This action is repeated by steps until the last or top volume of the liquid is fully saturated. I now remove the basket after the liquid has absorbed all the bichromate it will hold in solution and add dilute sulphuric acid and then place the carbon in position, the active solution around the zinc being preferably dilute sulphuric acid and mercury in the usual well-known proportions. The battery is now ready for use.

I am aware that it is old to make a saturated solution of bichromate of potash by suspending the crystals thereof in water in the top of a jar containing the carbon electrode and allowing the saturation to thus take place from top to bottom throughout the entire volume, and I make no claim herein, broadly, to such a method or process.

I believe it is new with me to make a saturated solution for a battery in the manner described by successive steps of saturation, and my claims are directed to this feature of novelty alone.

Having thus described my invention, what I claim, and desire to secure by Letters Patent of the United States, is—

1. The described method of preparing a saturated solution for a battery fluid, consisting in suspending a mass of soluble crystals at a point near the bottom of the solvent or liquid and allowing the bottom portion of the liquid to absorb the dissolved crystals, and then raising the mass to a higher point for a time, and continuing the steps in succession until the liquid has become fully saturated.

2. The described method of preparing a saturated solution of bichromate of potash or analogous depolarizing-salt for use in a voltaic battery, consisting in suspending a mass of bichromate crystals in a volume of water at a point near the bottom of the containing-vessel until the lower portion of the volume is completely saturated, then raising the mass a short distance until an additional portion of the volume is completely saturated, and continuing the successive steps until the entire or complete saturation is effected.

EDWARD POPPOWITSCH.

Witnesses:
 PETER CLAUS,
 HERMAN WÜSTENFELD.